(12) United States Patent
Fone

(10) Patent No.: US 6,186,203 B1
(45) Date of Patent: Feb. 13, 2001

(54) SHOCK ABSORBING TIRE

(76) Inventor: John Lawrence Fone, 136 Newport Road, New Bradwell, Milton Keynes, MK13 0AA (GB)

( * ) Notice: Under 35 U.S.C. 154(b), the term of this patent shall be extended for 0 days.

(21) Appl. No.: 09/155,848

(22) PCT Filed: Feb. 6, 1998

(86) PCT No.: PCT/GB98/00385

§ 371 Date: Oct. 7, 1998

§ 102(e) Date: Oct. 7, 1998

(87) PCT Pub. No.: WO98/34798

PCT Pub. Date: Aug. 13, 1998

(30) Foreign Application Priority Data

Feb. 7, 1997 (GB) .................................................. 9702526

(51) Int. Cl.⁷ ................................ B60C 5/20; B60C 5/22
(52) U.S. Cl. .................................... 152/331.1; 152/339.1; 152/340.1
(58) Field of Search ............................. 152/339.1, 340.1, 152/341.1, 342.1, 331.1, 333.1

(56) References Cited

U.S. PATENT DOCUMENTS

| | | | |
|---|---|---|---|
| 1,962,143 | * | 6/1934 | Ford .................................. 152/342.1 |
| 2,690,779 | | 10/1954 | Rust . |
| 3,601,174 | * | 8/1971 | Shotwell et al. .................. 152/331.1 |
| 5,109,905 | * | 5/1992 | Lambe ......................... 152/339.1 X |

FOREIGN PATENT DOCUMENTS

| | | |
|---|---|---|
| 296 05 622 U1 | 8/1996 | (DE) . |
| 728.366 | 11/1932 | (FR) . |

* cited by examiner

Primary Examiner—Adrienne C. Johnstone

(57) ABSTRACT

A shock absorbing tire and wheel assembly, particularly suitable for civil engineering plant comprises interconnected outer (15) and inner (14) chambers. The chambers are interconnected by passages which preferentially allow flow from the outer chamber (15) to the inner chamber (14). The passages preferably include at least one passage (21) which permits flow in either direction between the chambers and at least one passage (22) which permits flow from the outer chamber to the inner chamber, but prevents or restricts reverse flow. The passages (22) may be fitted with flap valves (23).

8 Claims, 3 Drawing Sheets

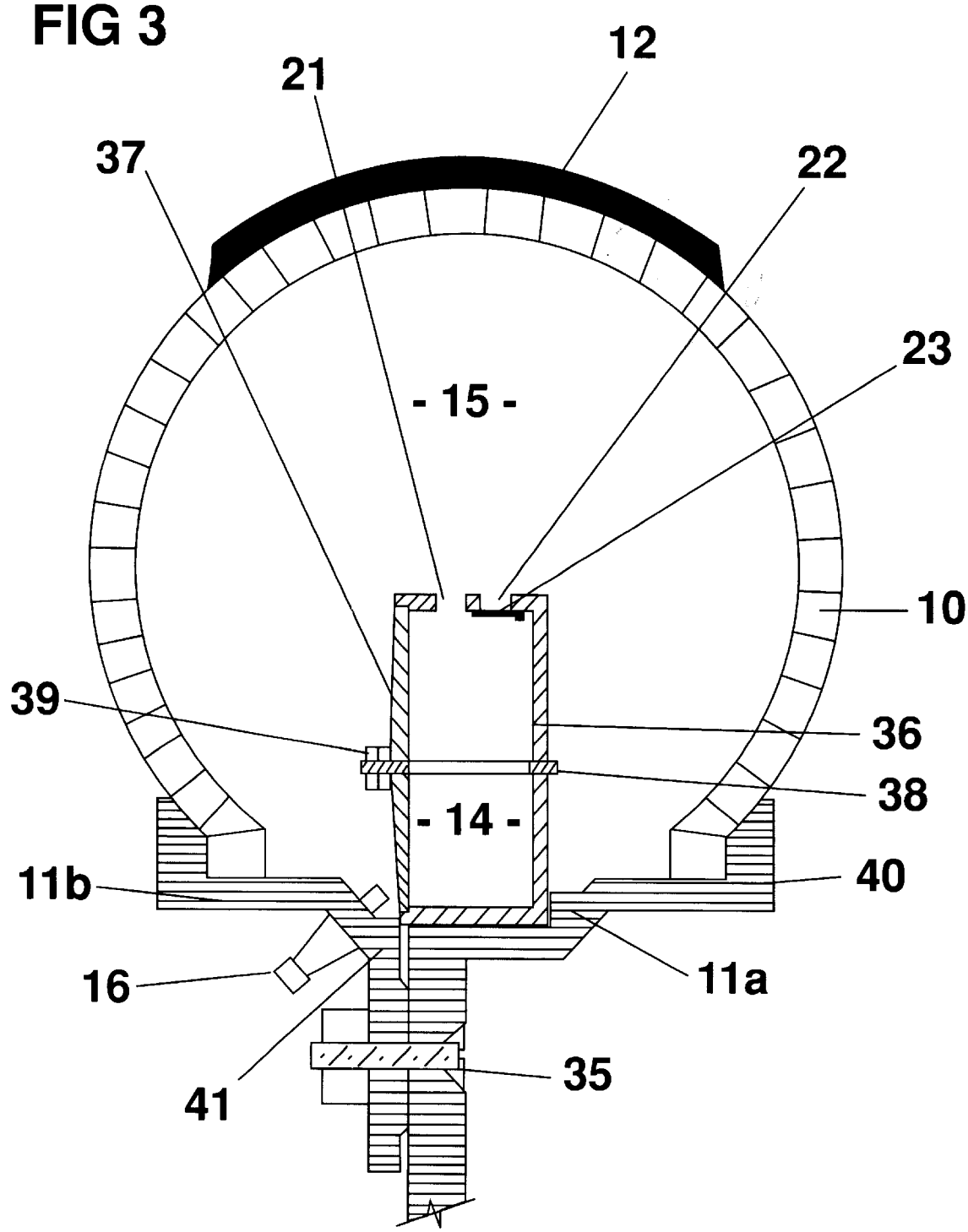

SHOCK ABSORBING TIRE

BACKGROUND AND BRIEF SUMMARY OF THE INVENTION

The present invention relates generally to tire and wheel assemblies suitable for vehicles and other items fitted with wheels. The preferred embodiments of the invention are particularly useful for earth moving and excavating vehicles with low pressure tires, but the invention is not limited to this application and will have numerous other applications.

According to one aspect of the present invention a tire and wheel assembly comprises a plurality of chambers for containing pressurised fluid, at least two of the chambers being interconnected by means enabling flow of fluid between one chamber and the other, the connecting means allowing fluid to pass preferentially from the one chamber to the other so providing a shock absorbing effect when the tire passes over an obstruction.

The pressurised fluid will, in general, be air or other gas or vapour or a mixture of air or gas or vapour or a combination of any of the foregoing with a liquid.

A non-mechanical shock absorber within the tire enables earth moving and excavating vehicles to retain structural strength for excavating with the facility to travel faster on site roads or public roads. This reduces cycle times on site and transport times between sites leading to increased productivity.

By virtue of the fact that fluid passes preferentially from one chamber to the other the tire and wheel assembly of the present invention has a shock absorption facility which is particularly suitable for use on earth moving and excavating vehicles.

Multi-chamber tires have been proposed hitherto. Most of them have been devised with safety in mind and as a result the individual chambers are interconnected such that air passes freely from the inner chamber to the outer chamber during inflation and use until a puncture or blow-out when gas or air loss is restricted from the inner chamber.

The tire and wheel assembly of the preferred embodiment of the present invention has at least one first passage interconnecting outer and inner chambers enabling substantial free flow of air or other gases between the chambers. In order to ensure that air or other gases flow preferentially from outer to inner chambers at least one second passage may be provided which allows air or other gases to pass from the outer to the inner chambers only. This may be achieved by using a one-way valve in at least some of the second passages.

The ratio between the free flow path and the one way flow path and the relative sizes of outer and inner chambers will be determined by experiment and possibly varied according to the particular application for which the tire is designed. It is presently envisaged that the total one way flow path will have greater cross-sectional area than the two way flow path.

In one preferred embodiment of the invention a plurality of passages interconnect the outer and inner chambers some of which allow one-way air or gas flow only. The passages may be identical with the exception that some of them are provided with one way valves. As noted above in the case of several identical passages it is presently envisaged that there will be more "one-way" passages than "two-way" passages.

The use of one-way valves is a simple way of ensuring preferential flow of gas from one chamber to another. Alternatively valve or restrictor designs may be available which themselves define a two-way flow path with preferential flow in one direction. For example, a plurality of flap valves may be provided, the flap of each valve being formed with a through passage. With such an arrangement the flap valves will open to allow relatively free flow of fluid in one direction, and the through passages will permit restricted flow in the opposite direction.

The tire and wheel assembly itself may define a single chamber divided into outer and inner chambers by a dividing wall or walls extending across the single chamber. The dividing wall may be a sheet secured to or integral with the tire. Alternatively the inner chambers may be partially or completely surrounded by the outer chamber. Either way the tire may be designed to sit on a wheel rim with the wheel rim defining one wall of one or more of the chambers. For example a single inner chamber may be designed as a complete inner tube which is partially or completely enclosed by a tire and wheel assembly defining the outer chamber or the means defining both outer and inner chambers may be the wheel rim with the outer chamber partially surrounding the inner chamber.

In all the foregoing examples of the invention it may be necessary for inner chambers to be reinforced to prevent collapse under excess pressure in the outer chamber and to encourage air or other gases to flow from the outer chamber to the inner chambers.

Alternatively the inner chamber may be fabricated to form a single or a series of rigid chambers each assembled and connected radially to form a single rigid construction attached to the wheel rim.

BRIEF DESCRIPTION OF THE DRAWINGS

Several embodiments of the invention will now be described by way of example only and with reference to the accompanying drawings which for clarity feature only one inner chamber. In the drawings:

FIG. 3 is a cross-sectional view of a third tire and wheel assembly according to the invention in which the inner chamber is a rigid chamber enclosed by the outer tire and wheel assembly.

DETAILED DESCRIPTION OF THE INVENTION

Figure 1:
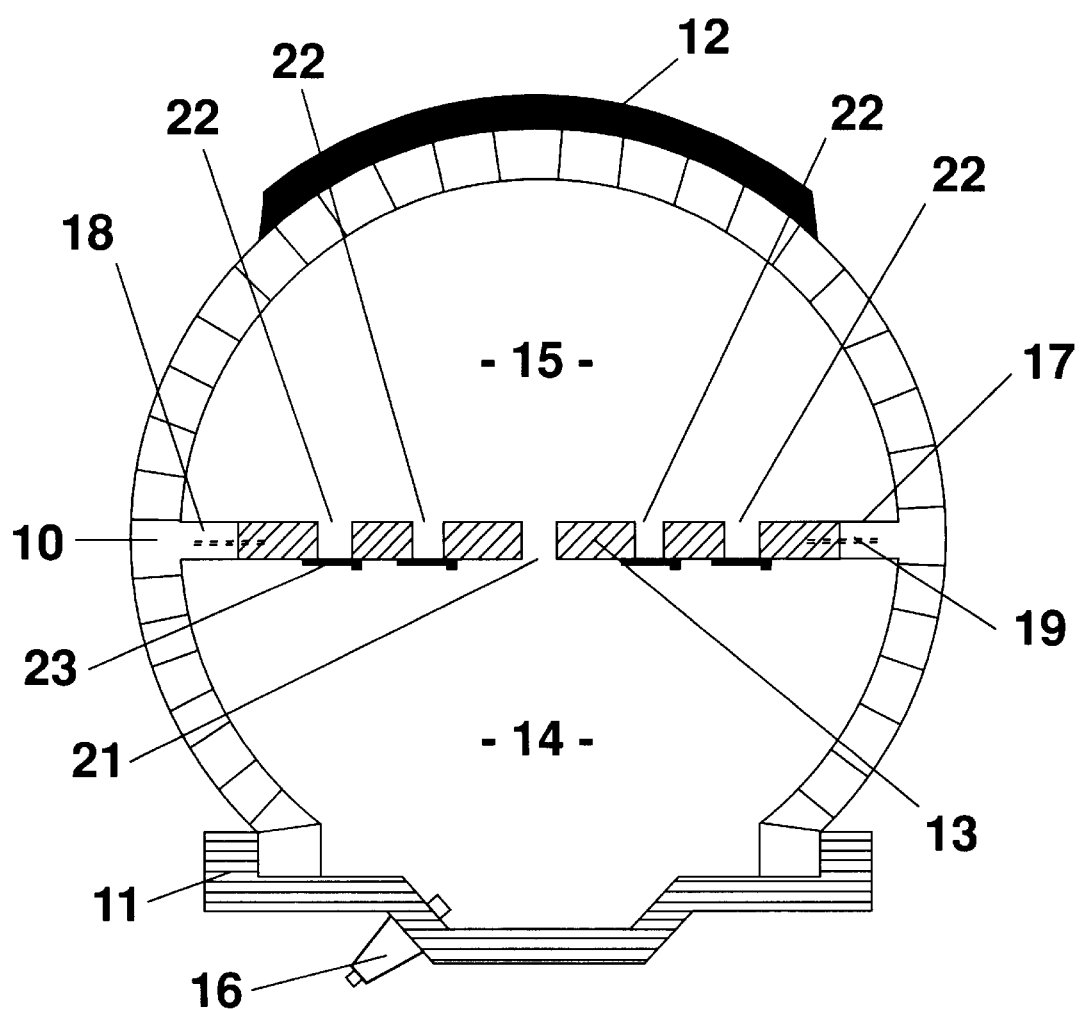
FIG. 1 is a cross-sectional view of a first tire and wheel assembly according to the invention comprising a single chamber divided by a transverse wall.

FIG. 1 illustrates a so called "tubeless" tire having a tire body 10 which defines an open chamber which is closed by the wheel rim 11. Reference numeral 12 indicates the tread portion. The chamber is divided by means of a cylindrical dividing wall 13 into an outer chamber 15 and an inner chamber 14. The tire is inflated via valve 16 with compressed air or other gases and may, optionally, be partially filled with a liquid.

The tire body 10 is made from reinforced rubber and rubber additives and the dividing wall 13 may also be made similarly. FIG. 1 shows one example of how the dividing wall 13 may be attached to the tire body 10. The tire body 10 has opposing inwardly facing flanges 17, 18 to which the wall 13 is attached. Suitable reinforcing means generally indicated by reference numerals 19 and 20 possibly in the form of annular plates serve to retain the dividing wall with respect to the tire body 10.

The dividing wall 13 is provided with several through passages at locations spaced around the circumference. These include a number of free flow passages 21 one of which is illustrated in FIG. 1 and a number of one-way passages 22. The passages 22 are closed by one-way valves one of which is indicated by reference numeral 23 which enable air of other gases to pass from the outer chamber 15 to the inner chamber 14 only. Thus air or other gases may pass freely from one chamber to the other via the through passages 21 but by virtue of the additional passages 22 air or other gases pass more readily from the outer chamber to the inner chamber. Thus the air or other gases are redistributed under pressure on the tread 12 in response to bumps in the road or other running surface.

In contrast to some known multi-chamber tires, the tire of the present invention has the advantage that by virtue of the passage 21 a single filler valve can be used to fill both chambers 14 and 15.

The valves 23 are illustrated as simple flap valves which may be made from rubber and vulcanised to the dividing wall 13. Any type of one-way valve may be used however.

Figure 2:
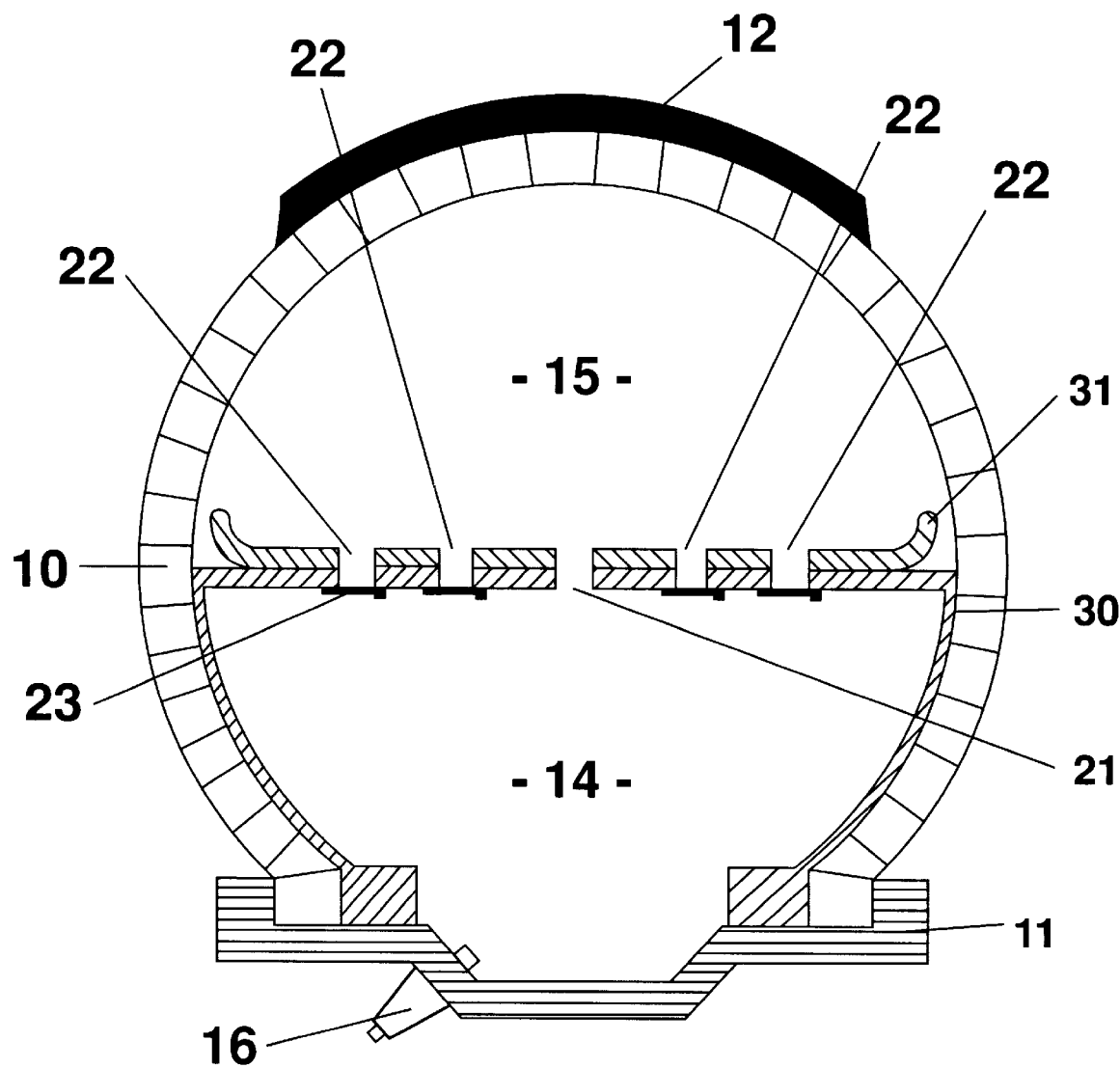
FIG. 2 is a cross-sectional view of a second tire and wheel assembly according to the invention in which both the outer and inner chambers are defined by the tire and wheel assembly.

In the embodiments of the invention shown in FIGS. 2 and 3 like parts have been indicated with like reference numerals. In FIG. 2 a tire body 10 for a tubeless tire is provided with a smaller tire body 30 which is housed inside the tire body 10. The tire body 30 defines an open chamber which is closed by the wheel rim 11. The holes 21 and 22 which interconnect the inner and outer chambers 14 and 15 are provided in the inner tire body 30. The inner tire body 30 may be made from a material which is more flexible than the material of the tire body 10. For example the inner tire body 30 may be made from the same material as a traditional inner tube. The inner tire body 30 is preferably vulcanised to the outer tire body 10 to prevent it from, moving with respect to the tire body 10 though this may not be necessary.

If the tire body 30 is made from a material which is more flexible than the main tire body 10 some additional strengthening may be necessary in the region which divides the inner and outer chambers. This is illustrated as an annular reinforcing plate 31. The plate 31 is provided with holes which are aligned with the holes 21 and 22 in the inner tire body 30. It should be noted that there is a gap between the edge of the plate 31 and the tire body 10 to allow for some flexing of the tire body 10. The edges of the plate 31 are rounded to minimise any wear which may occur if the plate 31 touches the tire body 10. It will be appreciated that the inner tire body 30 may be replaced by a complete inner tube which does not completely fill the tire body 10. In other words the inner tire body may completely define the inner chamber 14 rather than the chamber 14 being closed by the wheel rim 11.

FIG. 3 illustrates a further embodiment of the invention designed for use with two-part wheel rims in which the inner chamber 14 is defined by a rigid housing enclosed within the tire and wheel assembly. The wheel rim is in two parts 11a and 11b secured together by means of countersunk screws one of which is indicated at reference numeral 35. The inner chamber 14 is defined by a rigid annular chamber which is in this example rectangular in cross-section. The annular chamber 14 is formed by a first wall portion 36 which is generally C shaped in cross-section and defines three walls of the chamber 14 and a second circular lid portion 37. The first wall portion 36 is provided with the holes 21 and 22. The lid portion 37 is attached to the wall portion 36 by several shouldered screws 38 secured by locking nuts 39. The walls of the chamber 14 are formed in two parts for practical purposes but the provision of the cover 37 has the advantage that it enables access to the one-way valves 23 for example for maintenance.

It will be noted that the wheel portion 11a is provided with an annular shoulder 40 against which the wall portion 36 is located. An opposing shoulder 41 for retaining the wall portion 36 in place is provided on wheel rim portion 11b. Any gaps between the wall portion 36 and the wheel rim 11a may be sealed by suitable sealant e.g. mastic sealant.

It is likely that the tire 10 will not flex enough to enable it to be positioned around the rigid inner chamber 14 and therefore it is envisaged that the wall potion 36 and the lid portion 37 will each be formed in at least two part-circular portions which are bolted and flanged together. Thus in order to assemble the wheel and tire assembly of FIG. 3 the tire body 10 would be positioned with respect to the wheel rim portion 11a. The chamber 14 comprising portions 36 and 37 would then be assembled inside the tire body 10 and the second wheel rim portion 11b would then be screwed to the first wheel rim portion 11a.

It will be noted that in all the foregoing embodiments of the invention the holes 21 and 22 interconnecting the inner and outer chambers 14 and 15 extend radially. It will be appreciated that the holes could extend in other directions particularly in the embodiment of FIG. 3 in which the holes could extend in the same direction as the screws 38 i.e. parallel to the wheel axle.

In all embodiments the holes 21 and 22 will be positioned so as to maintain the dynamic balance of the wheel.

What is claimed is:

1. A tire and wheel assembly having a plurality of chambers for containing pressurized fluid, at least two of the chambers being interconnected by means enabling flow of fluid between one chamber and the other, the connecting means allowing fluid to pass preferentially from the one chamber to the other thus providing a shock absorbing effect when the tire passes over an obstruction, wherein the connecting means comprises at least one first passage which has substantially equal resistance to flow in both directions between the chambers and at least one second passage which permits relatively free flow from the said one chamber to the said other chamber but restricts or prevents flow in the reverse direction, at least one of the second passages being provided with a valve which permits preferential flow in one direction and restricted flow in the opposite direction.

2. A tire and wheel assembly as claimed in claim 1 wherein the one chamber is located radially outwardly, relative to the axis of rotation of the wheel, of the other chamber.

3. A tire and wheel assembly as claimed in claim 1 wherein the said other of the chambers is bounded on one side by the wheel.

4. A tire and wheel assembly as claimed in claim 1 wherein the said other of the chambers is in the form of a separate chamber inserted into the said one of the chambers.

5. A tire and wheel assembly as claimed in claim 1 wherein the chambers are separated by means of a sheet secured to or integral with the tire.

6. A tire and wheel assembly as claimed in claim 1 wherein at least one of the inner chambers is rigid.

7. A tire and wheel assembly as claimed in claim 1 wherein some of the second passages are provided with non-return valves.

8. A tire and wheel assembly as claimed in claim 7 wherein the non-return valves are flap valves.

* * * * *